US008886984B2

(12) United States Patent
Kim

(10) Patent No.: US 8,886,984 B2
(45) Date of Patent: Nov. 11, 2014

(54) COMPUTER AND POWER CONTROL METHOD THEREOF

(75) Inventor: Sung-hun Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1044 days.

(21) Appl. No.: 11/935,029

(22) Filed: Nov. 5, 2007

(65) Prior Publication Data

US 2008/0120513 A1 May 22, 2008

(30) Foreign Application Priority Data

Nov. 20, 2006 (KR) .................. 10-2006-0114837

(51) Int. Cl.
*G06F 1/26* (2006.01)
*G06F 1/32* (2006.01)

(52) U.S. Cl.
CPC ........... *G06F 1/3203* (2013.01); *Y02B 60/1292* (2013.01)
USPC ............................ 713/340; 713/300; 713/320

(58) Field of Classification Search
USPC .................................. 713/300, 310, 320, 340
See application file for complete search history.

(56) References Cited

U.S. PATENT DOCUMENTS

| | | | | |
|---|---|---|---|---|
| 5,058,023 A | * | 10/1991 | Kozikaro | 701/217 |
| 6,064,179 A | * | 5/2000 | Ito et al. | 320/128 |
| 7,252,919 B2 | * | 8/2007 | Suzuki et al. | 430/111.1 |
| 7,317,298 B1 | * | 1/2008 | Burns et al. | 320/107 |
| 2004/0236969 A1 | * | 11/2004 | Lippert et al. | 713/300 |
| 2005/0218939 A1 | * | 10/2005 | Ma | 327/78 |
| 2006/0227115 A1 | * | 10/2006 | Fry | 345/173 |
| 2008/0159875 A1 | * | 7/2008 | Wilke | 417/38 |

FOREIGN PATENT DOCUMENTS

| | | |
|---|---|---|
| JP | 08-320745 | 12/1996 |
| JP | 9-294332 | 11/1997 |
| JP | 2000-222074 | 8/2000 |
| JP | 2000-357031 | 12/2000 |
| KR | 1999-25067 | 4/1999 |
| KR | 10-0445595 | 8/2004 |
| KR | 10-2005-0036245 | 4/2005 |
| KR | 2005-101844 | 10/2005 |

OTHER PUBLICATIONS

Chinese Office Action issued Sep. 4, 2009 in CN Application No. 2007101681414.
Office Action issued in Korean Application No. 10-2006-0114837 on Jun. 5, 2013.
Notice of Allowance issued in Korean Application No. 10-2006-0114837 on Dec. 30, 2013.

* cited by examiner

*Primary Examiner* — Paul Yanchus, III
(74) *Attorney, Agent, or Firm* — Staas & Halsey LLP

(57) ABSTRACT

A computer including a system part, a battery mounted from the outside to supply power to the system part, a detector to detect a residual amount of the battery, and a controller to calculate a decreased residual amount of the battery based on the residual amount of the battery, and to control power supplied to the system part if the decreased residual amount of the battery is lower than a predetermined value, and if the residual amount of the battery is lower than a predetermined critical residual amount.

24 Claims, 4 Drawing Sheets

COMPUTER AND POWER CONTROL METHOD THEREOF

CROSS-REFERENCE TO RELATED APPLICATIONS

This application claims priority from Korean Patent Application No. 2006-0114837, filed on Nov. 20, 2006, in the Korean Intellectual Property Office, the disclosure of which is incorporated herein by reference in its entirety.

BACKGROUND OF THE INVENTION

1. Field of the Invention

The present general inventive concept relates to a computer and a power control method thereof, and more particularly, to a computer which includes a battery and a power control method thereof.

2. Description of the Related Art

A portable computer, such as a notebook computer, typically employs an adaptor as a main power source and a battery as an auxiliary power source. Thus, the portable computer receives alternating current (AC) power from the adaptor to supply power to a system part or charge the battery or receives direct current (DC) power from the battery to supply power to a system part. The battery which supplies auxiliary power is typically a smart battery having a microcomputer capable of storing battery information.

The portable computer having the smart battery regularly monitors the information relating to the battery to determine a residual amount of the battery, and informs a user that the battery is almost exhausted if the determined residual amount of the battery is lower than a default value or a preset value. If the residual amount of the battery is determined to be lower than the preset value, then the computer enters a power-saving mode.

A battery connector mounted in the portable computer is exposed externally to be connected with the computer, and includes a plurality of pins, which are susceptible to external electrostatic discharge (ESD) or noise capable of being introduced thereto.

If an overvoltage is applied instantly as a result of the ESD or noise, the computer may enter the power-saving mode even if the residual amount of the battery is sufficient, thereby causing malfunctions. Furthermore, an overvoltage may cause information on the residual amount of the battery to be corrupted, thereby misinforming a user who may schedule tasks based on the misinformation, thereby resulting in inefficiency.

SUMMARY OF THE INVENTION

The present general inventive concept provides a computer to calculate a decreased residual amount based on a residual amount of a battery, and to prevent malfunctions due to external influences and to protect a system part from a momentary overvoltage.

The present general inventive concept also provides a computer to supply a user with correct information on a residual amount of a battery based on a calculated decreased residual amount of a battery, and a power control method thereof.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a computer, comprising a system part to process data; a battery to supply power to the system part; and a control system to determine a residual amount of the battery, to calculate a decreased residual amount of the battery based on the determined residual amount, and to control the power supply to the system part based on comparing the calculated decreased residual amount and the residual amount to a predetermined value.

The calculated decrease residual amount may be compared to a predetermined value and the residual amount may be compared to a predetermined critical residual amount.

The battery can be mounted to the computer from an external location.

The computer may further comprise a detector to detect a residual amount of the battery.

The controller may adjust a time interval to calculate the decreased residual amount of the battery.

The computer may further comprise a storage part, wherein if the decreased residual amount of the battery is lower than the predetermined value, the controller stores the information on the residual amount of the battery in the storage part.

The computer may further comprise a display part, wherein the controller controls the display part to display the information on the residual amount of the battery thereon.

The computer may further comprise a user interface (UI) generator, wherein the controller controls the UI generator to generate a UI of the information on the residual amount of the battery to be displayed on the display part.

The computer may further comprise a field effect transistor (FET), wherein the controller controls the field effect transistor to cut off power supplied to the system part.

The foregoing and/or other aspects and utilities of the present general inventive concept may also be achieved by providing a method of controlling power of a computer having a system part, and a battery mounted from the outside and to supply power to the system part, the method comprising detecting a residual amount of the battery, calculating a decreased residual amount of the battery based on the residual amount thereof, and cutting off power supplied to the system part when the decreased residual amount is lower than a predetermined value and when the residual amount of the battery is lower than a predetermined critical residual amount.

The calculating of the decreased residual amount of the battery may comprise adjusting a time interval temporarily to calculate the decreased residual amount of the battery.

The calculating of the decreased residual amount of the battery may comprise storing the information on the residual amount of the battery when the decreased residual amount is lower than the predetermined value.

The storing of the information on the residual amount of the battery may comprise displaying the stored information on the residual amount of the battery.

The cutting off power supplied to the system part may comprise cutting off power supplied to the system part by utilizing a field effect transistor.

The power may be cutoff when the decreased residual amount of the battery is lower than the predetermined value.

The power may be cutoff when the residual amount of the battery is lower than the predetermined critical residual amount.

The adjustment to control the time interval to calculate the decreased residual amount of the battery is a temporary adjustment.

The foregoing and/or other aspects and utilities of the present general inventive concept may also be achieved by providing a mountable battery to supply power to a computer, the battery comprising a control system to determine a residual amount of the battery, to calculate a decreased residual amount of the battery based on the determined residual amount, and to control the power to the control system based on comparing the calculated decreased residual amount and the residual amount to a predetermined value.

The predetermined value may be an ideal decreased residual amount and/or a critical amount.

If the decreased residual amount of the battery is not equal to the predetermined value, the control system may decrease the power to the system part.

The foregoing and/or other aspects and utilities of the present general inventive concept may also be achieved by providing a method of controlling a decrease in a computer battery, the method comprising inputting a predetermined residual amount, inputting a predetermined time, detecting an actual residual amount of the battery, calculating a decreased residual amount of the battery based on the predetermined residual amount, the predetermined time, and the actual residual amount of the battery, and decreasing supply of power to a system part of the computer if the decreased residual amount of the battery is not the same as the predetermined residual amount.

The method of controlling a decrease in a computer battery may further comprise inputting a predetermined critical residual amount, calculating a residual amount of the battery based on the predetermined critical residual amount, the predetermined time, and the actual residual amount of the battery, and decreasing supply of power to a system part if the residual amount of the battery is less than the predetermined critical residual amount.

If the decreased residual amount of the battery is higher than the predetermined value, then a controller may determine that the actual residual amount of the battery is a corrupt value.

The method of controlling a decrease in a computer battery may further comprise determining that the actual residual amount of the battery is a corrupt value, rejecting the corrupt value, and receiving an additional value on the actual residual amount of the battery.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
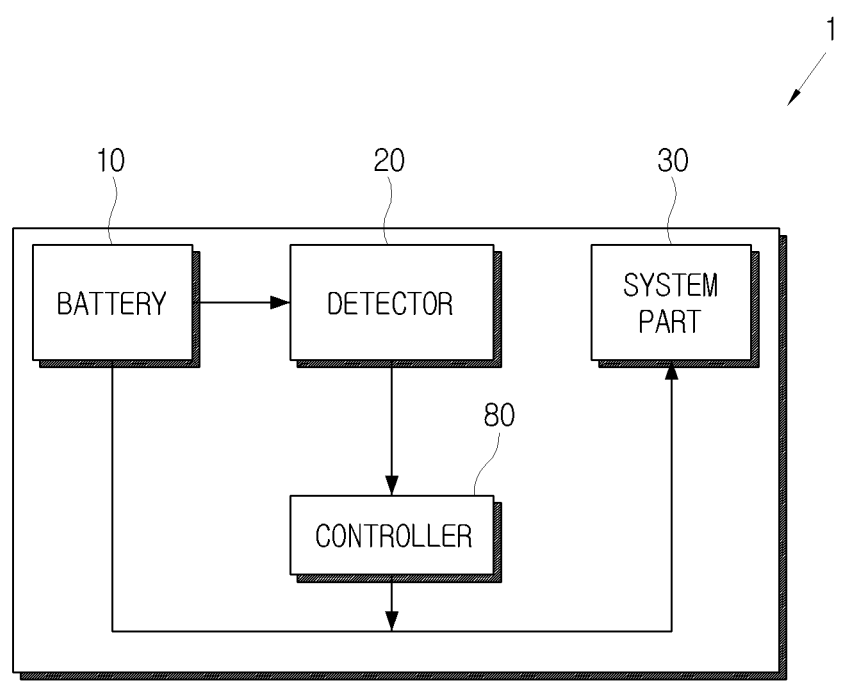
FIG. 1 is a block diagram of a computer according to an exemplary embodiment of the present general inventive concept.
Figure 2:
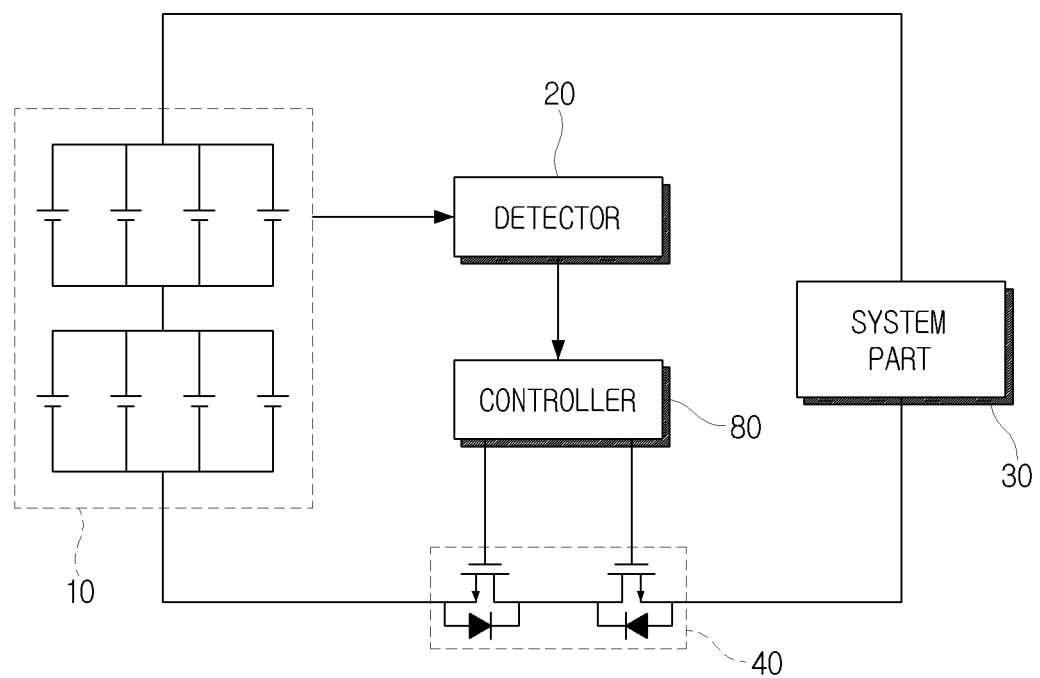
FIG. 2 is a circuit diagram of the computer according to the exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures FIG. 1 is a block diagram of a computer according to an exemplary embodiment of the present general inventive concept. FIG. 2 is a circuit diagram of the computer according to the embodiment of the present general inventive concept. As illustrated therein, a computer 1 according to the present embodiment includes a battery 10, a detector 20, a system part 30 and a controller 80. The computer 1 according to the present general inventive concept may include an electronic device with an external secondary battery such as, but not limited to a mobile phone, a portable computer such as a notebook computer, and/or a personal digital assistant (PDA).

The battery 10 serves as an auxiliary power source of the computer 1 if alternating current (AC) power is not supplied. That is, the computer 1 may further include a power supply (not illustrated) which converts AC power into direct current (DC) power of a predetermined level and supplies the DC power to the system part 30. The battery 10 may include a smart battery, which supplies information on identification of the battery, temperature of the battery, and current of the battery.

The detector 20 detects information on a residual amount of the battery 10 and transmits the information to the controller 80. The detector 20 according to the present embodiment may include an analog front end (AFE), which serves as a protection integrated circuit (IC) to detect an internal voltage of the battery 10 and to assist in cutting off power supplied to the system part 30.

The detector 20 may include a register, and may adjust a value of the register based on the detected residual amount of the battery 10 to be supplied to the controller 80. That is, the detector 20 stores a value of 0 or 1 in the register according to the information on the residual amount of the battery 10, and transmits the stored value to the controller 80. Then, the controller 80 may determine the state of the battery 10 according to the residual amount of the battery 10 from a reception result of receiving the value of 0 or 1.

The system part 30 includes a plurality of electronic components to process data. The system part 30 according to the present general inventive concept includes, but is not limited to a CPU, a RAM, a ROM, a hard disk, a South bridge, a North bridge, a graphic card, a sound card, and a network card. The system part 30 operates by receiving power of a predetermined level from the battery 10.

The controller 80 calculates a decreased residual amount of the battery 10 according to the residual amount of the battery 10 detected by the detector 20, and decreases the supply of power to the system part 30 if the decreased residual amount of the battery 10 is higher than a predetermined value. The controller 80 according to the present embodiment may be realized as a microcomputer and/or software.

If the decreased residual amount of the battery 10 is higher than the predetermined value, the controller 80 may determine that the information on the residual amount of the battery 10 is corrupted due to external influences. If the controller 80 determines that the information on the residual amount of the battery 10 is corrupt, the controller 80 may reject and not receive the information detected by the detector 20 in order to receive the correct information on the residual amount of the battery 10.

The controller 80 receives the information on the residual amount of the battery 10 detected by the detector 20 at predetermined time intervals to calculate the decreased residual amount of the battery 10 with respect to a predetermined time. If the actual decreased residual amount of the battery 10 is lower than a predetermined decreased residual amount value and if the actual residual amount of the battery 10 is lower than a predetermined residual amount value, the controller 80 decreases or stops the supply of power to the system part 30 so that the computer 1 enters a power-saving mode. The predetermined time interval, the predetermined time, the predetermined decreased residual amount value, and the predetermined residual amount value may be values based on a varying number of criteria, such as a desired length of the power-saving mode, battery type, and/or intended use. An example of predetermined settings includes a predetermined time interval of one minute (1 min), a predetermined time of five minutes (5 min), a predetermined decreased residual amount value of three volts (3V), and a predetermined residual amount value of two volts (2V). A computer 1 operating with these predetermined settings may operate such that after a 1 min time interval, the controller 80 receives information that the battery 10 has an actual decreased residual amount value of 2.75V, which is less than the predetermined decreased value (3V) and an actual residual amount value less than the predetermined residual amount value (2V), thus resulting in the controller 80 decreasing or stopping the supply of power to the system part 30 so that the computer 1 enters a power-saving mode.

If the computer 1 enters the power-saving mode, the controller 80 stops the detector 20 from continuous detection of the residual amount of the battery 10, thereby minimizing power consumption.

If the battery 10 is charged by power received externally or discharged by supplying power to the system part 30, a decrease in the residual amount of the battery 10 due to the external ESD and noise is not significant. However, if the battery 10 is not charged or is discharged while it is mounted in the computer 1, the residual amount of the battery 10 decreases significantly due to the external ESD and noise. Thus, if the battery 10 is neither charged nor discharged, the controller 80 may calculate the decreased residual amount based on the residual amount of the battery 10, and determine whether a voltage of the battery 10 has decreased due to external influences.

The controller 80 may temporarily increasingly or decreasingly adjust the time intervals to receive the information on the residual amount of the battery 10 from the detector 20 to determine the decreased residual amount of the battery 10.

That is, the controller 80 may increase the time intervals from the preset time intervals. Thus, if the cell in the battery 10 has a voltage of 3V or lower, the controller 80 may determine that the voltage of the battery 10 is dropped due to an overdischarge of the battery 10 instead of the external influences, thereby controlling the computer 1 to enter the power-saving mode by decreasing or stopping the supply of power to the system part 30.

Since the detector 20 is realized as an analog device, such as the AFE, the controller 80 may determine the instant overdischarge of the battery 10, thereby preventing the computer 1 from entering the power-saving mode when the battery 10 is not overdischarged.

Figure 3:
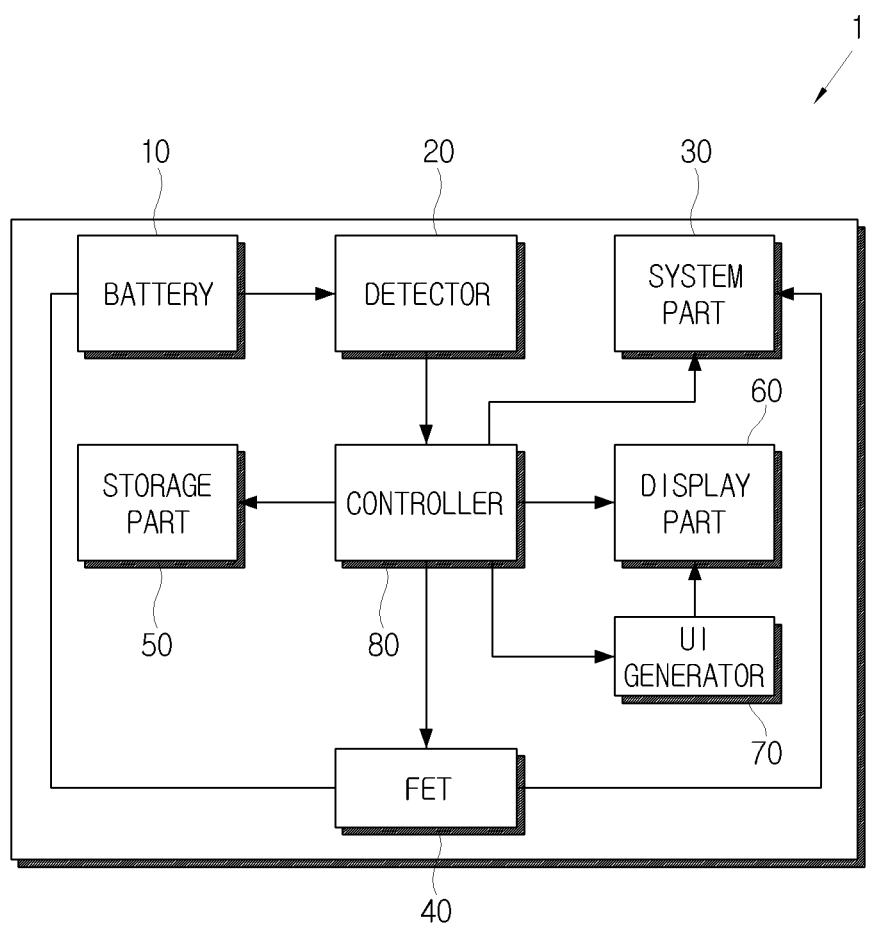
FIG. 3 is a block diagram of a computer according to another exemplary embodiment of the present general inventive concept.

Hereinafter, a computer 1 according to another exemplary embodiment of the present general inventive concept will be described with reference to FIG. 3. As illustrated in FIG. 3, the computer 1 according to this embodiment further includes a field effect transistor (FET) 40, a storage part 50, a display part 60 and a user interface (UI) generator 70.

The FET 40 is turned on and off to supply and cut off power supplied to a system part 30 by a control of a controller 80. If a residual amount of the battery 10 is lower than a predetermined value, the FET 40 is turned off to stop supplying power to the system part 30 and enter a power-saving mode, thereby preventing malfunction of the system part 30 due to an overvoltage of the battery 10.

The storage part 50 stores information on the residual amount of the battery 10. The storage part 50 may include a flash memory, but is not limited thereto. The storage part 50 stores the information on the residual amount of the battery 10 if a decreased residual amount of the battery 10 is lower than a predetermined value, and displays the information stored in the storage part 50 on the display part 60, thereby providing correct information on the residual amount of the battery 10 to a user.

The display part 60 displays the information on the residual amount of the battery 10. The display part 60 according to the embodiment of FIG. 3 may include a liquid crystal display (LCD) contained in the computer 1. Otherwise, the display part 60 may include a light emitting diode (LED) contained in the battery 10. The display part 60 may include other types of displays in order to indicate a state of the battery, such as a plasma display or other backlit display.

The UI generator 70 generates a user interface (UI) of the information on the residual amount of the battery 10. The UI of the information on the residual amount of the battery 10 may display a level thereof as per predetermined operations and may be displayed on the display part 50 including the LCD.

Figure 4:
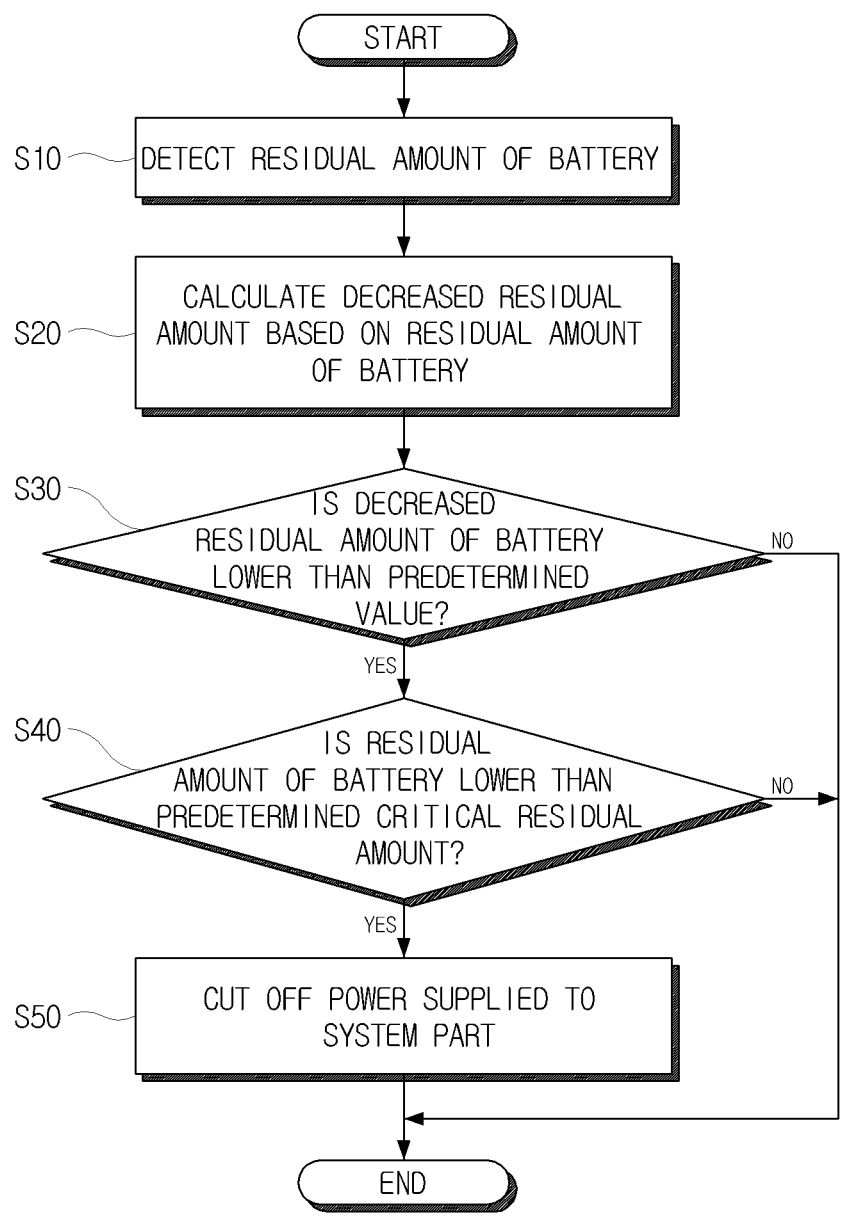
FIG. 4 is a flowchart of a power control method of the computer according to the present general inventive concept

Hereinafter, a method of supplying power to the computer 1 according to another embodiment of the present general inventive concept will be described with reference to FIGS. 3 and 4.

First, the controller 80 controls the detector 20 to detect the information on the residual amount of the battery 10 (operation S10). The controller 80 calculates the decreased residual amount of the battery 10 based on the residual amount detected at the operation of S10 (operation S20).

The controller 80 may temporarily increasingly or decreasingly adjust the time intervals to calculate the decreased residual amount of the battery 10.

The controller 80 determines whether the decreased residual amount of the battery 10 is lower than the predetermined value (operation S30). If the decreased residual amount of the battery 10 is lower than the predetermined value, the controller 80 determines whether the residual amount of the battery 10 is a predetermined critical residual amount (operation S40). If the residual amount of the battery 10 is lower than the predetermined critical residual amount to enter the power-saving mode, the controller 80 cuts off power supplied to the system part 30 (operation S50). Thus, the computer 1 may enter the power-saving mode depending on the actual residual amount of the battery 10.

If the decreased residual amount of the battery 10 is lower than the predetermined value at the operation S30 and if the residual amount of the battery 10 is lower than the predetermined critical residual amount at the operation S40, the storage part 50 may further store the information on the residual amount of the battery 10 therein.

The controller 80 may further control the display part 60 to display the information stored in the storage part 50.

Various embodiments of the present general inventive concept can be embodied as computer readable codes on a computer readable recording medium. The computer readable recording medium may include any data storage device suitable to store data that can be thereafter read by a computer system. Examples of the computer readable recording medium include, but are not limited to, a read-only memory (ROM), a random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Various embodiments of the present general inventive concept may also be embodied in hardware or in a combination of hardware and software. For example, the method of controlling power of a computer 1 may be embodied in software, in hardware, or in a combination thereof. In various embodiments, the method of controlling power of a computer 1 may be embodied as computer readable codes on a computer readable recording medium to perform operations, such as the operations illustrated in FIG. 4.

As described above, the present general inventive concept provides a computer, which is protected from a momentary overvoltage due to external influence and is prevented from malfunction, and a power control method thereof.

Also, the present general inventive concept provides a computer which provides correct information on a residual amount of a battery to a user, and a power control method thereof.

Although a few embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A computer, comprising:
   a system part to process data;
   a battery to supply power to the system part; and
   a control system to determine a residual amount of the battery, to calculate a decreased residual amount of the battery based on a difference between the determined residual amount and a previous residual amount, and to control the power supply to the system part based on comparing the calculated decreased residual amount to a nonzero predetermined value and comparing the residual amount to a predetermined critical residual amount,
   wherein:
   if it is determined that the decreased residual amount of the battery is lower than the predetermined value and that the residual amount of the battery is lower than the predetermined critical residual amount, the control system controls to cut off the power supply to the system part; and
   if it is determined that the decreased residual amount of the battery is higher than the predetermined value, the control system controls to maintain the power supply to the system part.

2. The computer of claim 1, wherein the battery is mounted to the computer from an external location.

3. The computer according to claim 1, further comprising:
   a detector to detect a residual amount of the battery.

4. The computer according to claim 1, wherein the controller adjusts a time interval between the determined residual amount and the previous residual amount to calculate the decreased residual amount of the battery.

5. The computer according to claim 4, further comprising:
   a storage part,
   wherein if the decreased residual amount of the battery is lower than the predetermined value, the controller stores the information on the residual amount of the battery in the storage part.

6. The computer according to claim 5, further comprising:
   a display part,
   wherein the controller controls the display part to display the information on the residual amount of the battery thereon.

7. The computer according to claim 6, further comprising:
   a user interface (UI) generator,
   wherein the controller controls the UI generator to generate a UI of the information on the residual amount of the battery to be displayed on the display part.

8. The computer according to claim 1, further comprising:
   a storage part,
   wherein the decreased residual amount is lower than the predetermined value and the controller stores the information on the residual amount of the battery in the storage part.

9. The computer according to claim 8, further comprising:
   a display part,
   wherein the controller controls the display part to display the information on the residual amount of the battery thereon.

10. The computer according to claim 9, further comprising:
    a user interface (UI) generator,
    wherein the controller controls the UI generator to generate a UI of the information on the residual amount of the battery to be displayed on the display part.

11. The computer according to claim 1, further comprising:
    a field effect transistor,
    wherein the controller controls the field effect transistor to cut off power supplied to the system part based on based the comparison of the decreased residual amount to the predetermined value and the residual amount to the predetermined critical residual amount.

12. A method of controlling power of a computer having a system part, and a battery mounted from the outside and to supply power to the system part, the method comprising:
    detecting a residual amount of the battery;
    calculating a decreased residual amount of the battery based on a difference between the detected residual amount of the battery and a previous residual amount of the battery; and
    cutting off power supplied to the system part when the decreased residual amount is lower than a nonzero predetermined value and when the residual amount of the battery is lower than a predetermined critical residual amount, and maintaining the power supplied to the system part when the decreased residual amount of the battery is higher than the predetermined value.

13. The method according to claim 12, wherein the calculating of the decreased residual amount of the battery comprises:
    adjusting a time interval temporarily to calculate the decreased residual amount of the battery.

14. The method according to claim 12, wherein the calculating of the decreased residual amount of the battery further comprises:
    storing the information on the residual amount of the battery when the decreased residual amount is lower than the predetermined value.

15. The method according to claim 14, wherein the storing of the information on the residual amount of the battery further comprises:

displaying the stored information on the residual amount of the battery.

16. The method according to claim 12, wherein the cutting off power supplied to the system part comprises:
cutting off power supplied to the system part by utilizing a field effect transistor.

17. The computer according to claim 1, wherein the control system temporarily adjusts a time interval between the determined residual amount of the battery and the previous residual amount of the battery to calculate the decreased residual amount of the battery.

18. A mountable battery to supply power to a computer, the battery comprising:
a control system to determine a residual amount of the battery, to calculate a decreased residual amount of the battery based on a difference between the determined residual amount and a previous residual amount, and to control the power to the control system based on comparing the calculated decreased residual amount to a nonzero predetermined value and the determined residual amount to a predetermined critical residual amount,
wherein:
if it is determined that the decreased residual amount of the battery is lower than the predetermined value and that the determined residual amount of the battery is lower than the predetermined critical residual amount, the control system controls to cut off the power to the control system; and
if it is determined that the decreased residual amount of the battery is higher than the predetermined value, the control system controls to maintain the power supply to the control system.

19. The mountable battery of claim 18, wherein if the decreased residual amount of the battery is not equal to the predetermined value, the control system decreases the power to the control system.

20. A method of controlling a decrease in a computer battery, the method comprising:
inputting a predetermined residual amount value;
inputting a predetermined time;
detecting an actual residual amount of the battery;
calculating a decreased residual amount of the battery based on a difference between the predetermined residual amount value and the actual residual amount of the battery at the predetermined time; and
decreasing supply of power to a system part of the computer if the decreased residual amount of the battery is greater than a nonzero predetermined decreased residual amount value.

21. The method of claim 20, further comprising:
inputting a predetermined critical residual amount value; and
decreasing supply of power to a system part if the calculated residual amount of the battery is less than the predetermined critical residual amount value.

22. The method of claim 20, wherein the controller determines that the actual residual amount of the battery is a corrupt value when the actual residual amount of the battery is greater than the predetermined residual amount value.

23. The method of claim 20, further comprising:
determining that the actual residual amount of the battery is a corrupt value;
rejecting the corrupt value; and
receiving an additional value on the actual residual amount of the battery.

24. The computer of claim 1, wherein the nonzero predetermined value is based on at least one of a desired length of a power-saving mode of the computer, a type of the battery, and an intended use of the battery.

* * * * *

UNITED STATES PATENT AND TRADEMARK OFFICE
CERTIFICATE OF CORRECTION

PATENT NO. : 8,886,984 B2  Page 1 of 1
APPLICATION NO. : 11/935029
DATED : November 11, 2014
INVENTOR(S) : Sung-hun Kim It is certified that error appears in the above-identified patent and that said Letters Patent is hereby corrected as shown below:

In the Claims

Column 8, line 35, in Claim 11, after "on" delete "based".

Signed and Sealed this
Second Day of June, 2015

Michelle K. Lee
*Director of the United States Patent and Trademark Office*